June 2, 1925.

A. LEWIS 1,540,026

BUCK SAW FRAME

Filed March 3, 1925

Inventor
Albert Lewis

By
Attorney

Patented June 2, 1925.

1,540,026

UNITED STATES PATENT OFFICE.

ALBERT LEWIS, OF BOOTHBAY HARBOR, MAINE.

BUCKSAW FRAME.

Application filed March 3, 1925. Serial No. 12,839.

*To all whom it may concern:*

Be it known that I, ALBERT LEWIS, a citizen of the United States, residing at Boothbay Harbor, in the county of Lincoln and State of Maine, have invented certain new and useful Improvements in Bucksaw Frames, of which the following is a specification.

This invention relates to an improved buck saw, but it has more particular reference to the construction of the frame and the novel means which is provided for tightening the saw blade.

Although the common type of buck saw frame is such as to permit the saw blade to be tightened, through the medium of a turn buckle structure, I find that the adjusting means is usually such as to distort the end bars and frame considerably so as to bend the saw blade to hinder effective sawing.

In view of the circumstances stated, I propose novel means which serves to properly maintain end bars of the frame in the same plane, the means being such that it moves the lower ends of the bars outwardly, and the upper ends inwardly toward each other, thus affording a tight blade which is truly straight and is not liable to break.

The novel details constituting the improved adjusting device will become apparent from the following description and drawings.

In the accompanying drawings, forming a part of this application, and in which like numerals are employed to designate like parts throughout the same:

Figure 1:
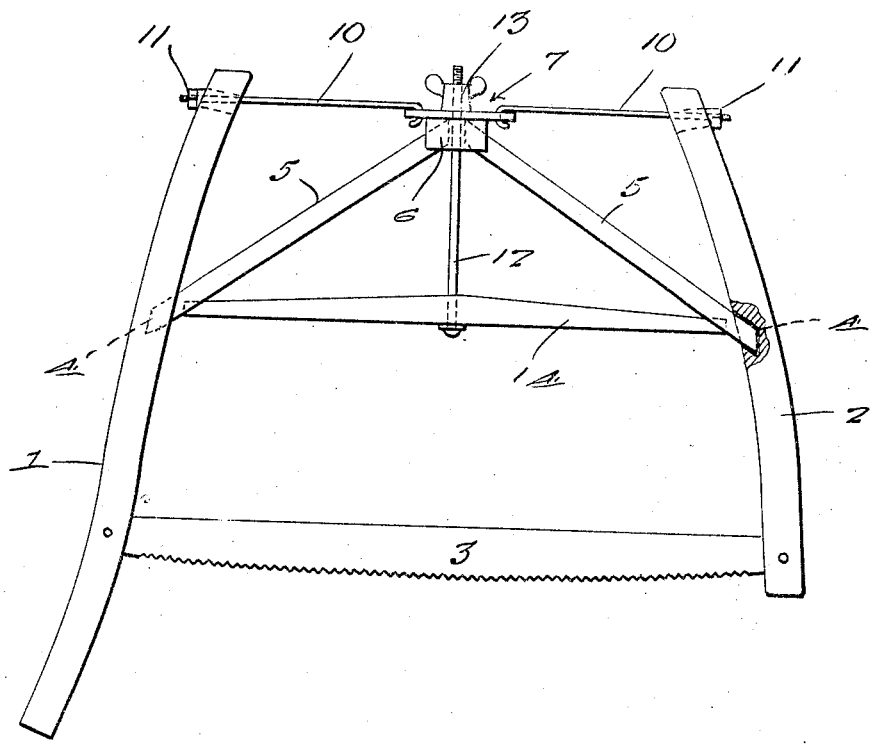
Figure 1 is a side elevation of a buck saw, constructed in accordance with the present invention.
Figure 2:
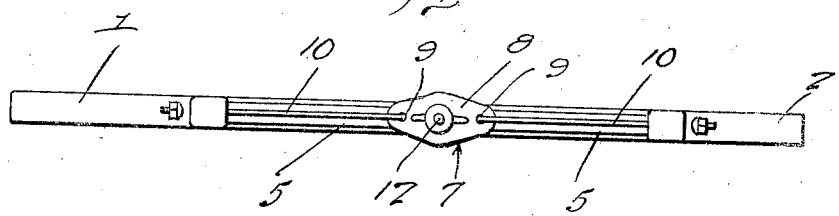
Figure 2 is a top plan view thereof.
Figure 3:
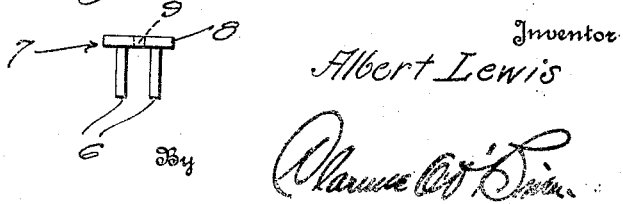
Figure 3 is an edge elevation of one of the details.

Referring to the drawings in detail, it will be seen that the reference characters 1 and 2 designate the end bars of the frame, to which the saw blade 3 is connected in the customary way. As is usual, one of the end bars has its lower end extended to provide a handle for manipulating the saw. In accordance with the present invention, the end bars are provided at opposite points, and in their inner vertical edges with morticed recesses 4. These are somewhat diagonally disposed with respect to the longitudinal axis of the bars, as shown in dotted lines. The recesses constitute seats for reception of the lower ends of a pair of downwardly diverging expanding strips 5. The lower ends rather loosely are seated in the recesses, so that they constitute fulcrums for the end bars to rock about slightly in the adjusting operation. The upper ends of these strips 5 are disposed between the side flanges of a novel casting 7. The casting also embodies a substantially diamond shaped plate 8, provided at its ends with openings 9. Hooked inner ends of a pair of bolts 10 are anchored in these holes, the outer threaded ends of the bolts extending through transverse openings formed at the upper ends of the aforesaid side bars. Tightening nuts 11 are screwed upon the ends of the bolts.

It will be noted that the plate 8 is formed with a central opening, and that an additional bolt 12 extends upwardly therethrough, there being a thumb nut 13 on the threaded end thereof. The bolt 12 also extends through central openings formed in a cross piece 14, which extends between and has its ends fitted into recesses formed in the lower end portions of the aforesaid strip 5.

From the foregoing description, it will be seen that by tightening the thumb nut 13, the casting 7 will be fed downwardly upon the bolt 12, thus exerting a downward push upon the upper converging ends of the strips, whereby to cause the latter to spread the side bars 1 and 2 of the frame. Simultaneously with the downward moving of the casting, the cross bar 14 moves upwardly to maintain rigidity, after the adjustment has been completed. Also such movement of the casting serves to exert an inward pull upon the hooked ends of the links or bolts 10, thus moving the upper ends of the side bars toward each other. In practice, it has been shown that with this arrangement, the side bars will always be maintained in the same plane, and thus a very uniform and partial adjustment can be made to stretch the cutting blade tautly without distorting it or any of the other details.

It is thought that the foregoing description, when read carefully in connection with the accompanying drawings will enable persons skilled in the art to which the invention relates to obtain a clear understanding of the same. For this reason a more lengthy description is thought unnecessary.

Although the preferred embodiment of the invention has been shown and described, it is to be understood that minor changes coming within the field of invention may be resorted to if desired.

What is claimed is:

1. In a saw structure, a pair of end bars, a saw blade connected at its ends to the lower portions of the end bars, a pair of bolts having their outer threaded ends connected with the upper portions of said end bars, means connecting the inner ends of said bolts together, fulcrums for the intermediate portions of said end bars, the upper ends of said fulcrums being in association with said connecting means, and additional means acting on the first named means for moving the latter downwardly to rock said end bars about said fulcrums and to move the upper ends of said end bars toward each other.

2. In a structure of the class described, a pair of end bars, a saw blade connected at its opposite ends to the lower portions of said bars, a pair of bolts connected at their outer ends to the upper ends of said bars, a connector between the inner ends of said bolts, an additional vertically disposed bolt extending through said connector, means for moving said bolt up or down, a pair of downwardly diverging strips having their upper ends associated with the connector and their lower ends loosely connected with the intermediate portions of said end bars, and means interposed between the lower end portions of said strips, said vertical bolt being connected with said last named means.

3. In a structure of the class described, a frame work embodying a pair of end bars, a saw blade connected at its opposite ends to the lower portions of said bars, a casting including a plate provided on its under side with downturned flanges, said plate being provided with apertures, a pair of bolts having hooked ends, the hooked ends being connected with certain of the apertures in said plate, a cross piece, a bolt connected to the intermediate portion of the cross piece and having its upper end extending upwardly through the remaining aperture in said plate, a thumb nut carried by the threaded upper end of said bolt and adapted to bear upon said plate, and downwardly diverging strips having their upper ends confined between said flanges and having their lower ends connected to the opposite ends of said cross piece.

4. A buck saw comprising a pair of end bars, a saw blade connected at its opposite ends to the lower portions of said bars, an adjustable connection between the upper ends of said bars, said connection embodying spaced depending confining flanges, a pair of downwardly diverging fulcrum strips having their upper ends confined between said flanges and their lower ends connected to the intermediate portions of said end bars, a cross piece connected at its ends to the lower end portions of said strips, and means connected to the intermediate portion of said cross piece and the aforesaid adjustable connection for actuating the latter to move the upper ends of said bars toward each other.

In testimony whereof I affix my signature.

ALBERT LEWIS.